(No Model.)

W. H. GONNE.
KNOB ATTACHMENT.

No. 291,712. Patented Jan. 8, 1884.

WITNESSES
Jacob T. Choate
Sumner Collins

INVENTOR
William H. Gonne
by Geo. H. Lothrop
ATTORNEY

UNITED STATES PATENT OFFICE.

WILLIAM H. GONNE, OF CHATHAM, ONTARIO, CANADA, ASSIGNOR OF ONE-HALF TO CHARLES H. WOOD, OF SAME PLACE.

KNOB ATTACHMENT.

SPECIFICATION forming part of Letters Patent No. 291,712, dated January 8, 1884.

Application filed September 25, 1883. (No model.)

*To all whom it may concern:*

Be it known that I, WILLIAM H. GONNE, of Chatham, in the county of Kent and Province of Ontario, Canada, have invented a new and useful Improvement in Door-Knob Attachments, of which the following is a specification.

Figure 1:
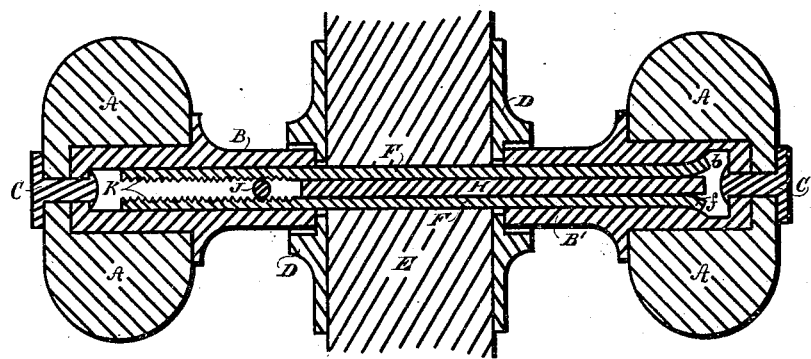
Figure 2:
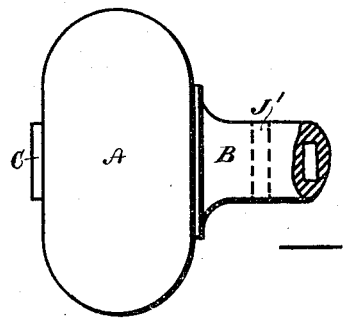

Figure 1 is a vertical section through the knobs and part of the door, and Fig. 2 is an elevation of one knob and part of its shank.

My invention consists in a novel mode of adjusting and fastening the knobs on the spindle, pointed out in the claim.

A represents two door-knobs fastened to the shanks B B' in any suitable manner, as by the rivets C, or otherwise.

The spindle consists of two flat plates of metal, F, one end of which, *f*, is bent slightly outward, and the inner sides of which are serrated for a portion of their length, as shown at K.

H represents a similar metal plate, straight and shorter than plates F, and the three plates F F H are of such size that together they will just fill the rectangular recess in shank B'. One of the shanks, B'. has at the inner end of its socket an enlarged recess, *b*. This recess may be at any desired point in the shank, as in some cases it may be desirable to have the socket reach only half-way, or less, the length of the shank, instead of nearly the whole length of the shank, as shown in the drawings.

J represents a metal pin, which passes through shank B, as shown in dotted lines, Fig. 2, and between the serrated portions of plates F. If pin J be softer than plates F, the serrations on the plates will cut into the pin and hold the parts firmly together, and if said pin be harder than said plates, it will cut a seat for itself when driven through the plates.

D D represent roses, and E the door.

To adjust the knob the plates F F are placed in the socket in shank B', and the plate N driven down between plates F until it forces the bent ends *f* of said plates into the recess *b*. The spindle is now passed through the roses and door until shank B' is in the proper position. Shank B is slipped on the end of the spindle until in the right position, when pin J is driven through the hole in shank B, passing between the serrated portions of plates F F and locking the knobs firmly in place.

It is obvious that this attachment can be rapidly and easily adjusted to doors of different thicknesses by any ordinary workman.

I am aware that it is old to form a door-knob spindle of two outer plates with an intermediate plate, the outer plates having each a pin projecting therefrom to fit into opposite notches of a series of rack-openings formed in the hollow shank of the knob, whereby the parts can be longitudinally adjusted by withdrawing the intermediate plate, so that the pins may be disengaged from the notches and set into other notches and held there by reinserting the intermediate plate.

What I claim as my invention, and desire to secure by Letters Patent, is—

In a door-knob attachment, a spindle consisting of two flat metal plates, each having one end bent slightly outward and the inner side of the other end serrated for a portion of its length, and a shorter similar straight plate adapted to separate the first-named plates, whereby a fastening-pin may be passed between said plates to engage with the serrated portion thereof, substantially as herein shown and described.

W. H. GONNE.

Witnesses:
 SUMNER COLLINS,
 GEO. H. LOTHROP.